(12) United States Patent
Korenblit et al.

(10) Patent No.: US 7,471,449 B2
(45) Date of Patent: Dec. 30, 2008

(54) METHOD AND APPARATUS FOR GENERATING TERAHERTZ RADIATION WITH MAGNON GAIN MEDIUM AND MAGNON MIRROR

(75) Inventors: Yehiel Korenblit, Netanya (IL); Boris G. Tankhilevich, Walnut Creek, CA (US)

(73) Assignee: Terahertz Technologies LLC, Walnut Creek, CA (US)

( * ) Notice: Subject to any disclaimer, the term of this patent is extended or adjusted under 35 U.S.C. 154(b) by 99 days.

(21) Appl. No.: 11/799,937

(22) Filed: May 2, 2007

(65) Prior Publication Data
US 2008/0192792 A1 Aug. 14, 2008

Related U.S. Application Data

(63) Continuation-in-part of application No. 11/481,197, filed on Jul. 3, 2006, now Pat. No. 7,430,074.

(51) Int. Cl.
*H01S 4/00* (2006.01)
*H01S 3/00* (2006.01)

(52) U.S. Cl. ................ 359/342; 372/37; 372/43.01
(58) Field of Classification Search ............ 359/342; 372/37, 43.01
See application file for complete search history.

(56) References Cited

U.S. PATENT DOCUMENTS 3,986,194 A * 10/1976 Masumoto et al. ....... 372/44.01

| 4,679,023 | A | 7/1987 | Nelson |
| 6,614,827 | B1 | 9/2003 | Mooradian |
| 2003/0021908 | A1 | 1/2003 | Nickel et al. |
| 2004/0094801 | A1 * | 5/2004 | Liang et al. ................. 257/347 |
| 2005/0242287 | A1 * | 11/2005 | Hakimi .................. 205/363.09 |
| 2006/0060815 | A1 * | 3/2006 | Punnoose ................ 252/62.56 |
| 2006/0108619 | A1 * | 5/2006 | Yoshida et al. .............. 257/295 |
| 2006/0238191 | A1 | 10/2006 | Saito |

OTHER PUBLICATIONS

S. A. Reshetnyak, "The approximation of geometrical optics for bulk spin waves in spatialy inhomogeneous ferromagnetic insulators with an exchange defect", American Institute of Physics, Apr. 2004, pp. 588-590, vol. 30, No. 4.

M. I. Kaganov and V. M. Tsukernik, "NonResonance Absorption of Oscillating Magnetic Field Energy by a Ferromagnetic Dielectric", Soviet Physics JETP, Mar. 1960, pp. 587-592, vol. 37 (10), No. 3.

I. YA. Korenblit and B. G. Tankhilevich, "High Frequency Magnon Generation by NonEquilibrium Electrons And The Instability Of The Magnon System", Physics Letters, pp. 307-308, vol. 64A, No. 3.

I. YA. Korenblit and B. G. Tankhilevich, "Generation of High-Frequency Magnons In A Ferromagnetic Semiconductor", Pis'ma Zh. Eksp. Teor. Fiz. 24, No. 11, pp. 598-601 (Dec. 5, 1976).

(Continued)

*Primary Examiner*—Eric Bolda
(74) *Attorney, Agent, or Firm*—Boris G. Tankhilevich (57) ABSTRACT

An apparatus for generation of Terahertz radiation comprising: (A) a Magnon Gain Medium (MGM), wherein the MGM supports generation of nonequilibrium magnons; and (B) at least one magnon mirror (MM). The nonequilibrium magnons are generated in the MGM. Interaction between nonequilibrium magnons leads to generation of Terahertz photons.

30 Claims, 3 Drawing Sheets

OTHER PUBLICATIONS

I. YA. Korenblit and B. G. Tankhilevich, "Generation Of High-Frequency Magnons by NonEquilibrium Electrons Polarized Opposite To The Direction Of Magnetization", Societ Physics JETP, Dec. 1977, pp. 1167-1175, vol. 46, No. 6.

I. YA. Korenblit, A. A. Samokhvalov and V. V. Osipov, "Heating And Generation Of Magnons By NonEquilibrium Electrons in Ferromagnetic Semiconductors", Soc. Sci. Re. A. Phys., 1987, pp. 447-517, vol. 8, Harwood Academic Publisher GmbH.

L. Passell, O. W. Dietrich and J. Als-Nielsen, "Neutron Scattering From The Heisenberg Ferromagnets EuO and EuS. I. The Exchange Interactions", Physical Review B, Dec. 1, 1976, pp. 4897-4907, vol. 14, No. 11.

J. Schoenes and P. Wachter, "Exchange Optics In Gd-doped EuO", Physical Review B, Apr. 1, 1974, pp. 3097-3105, vol. 9, No. 7.

M. Belhadi; A. Khater, "Spin Wave Modes And Magnon Scattering At Surface Nanostructure On 2D Heisenberg Ferromagnets", Surface Review and Letters, 2004, p. 99-109, vol. 11, No. 1, World Scientific Publishing Company.

M. Tsoi; A. G. M Jansen; J. Bass; W.-C. Chiang; V. Tsoi; P. Wyder, "Generation And Detection Of Phase-Coherent Current-Driven Magnons In Magnetic Multilayers", Letters to Nature, Nature, Jul. 6, 2000, p. 46-48, vol. 406, Macmillan Magazines Ltd.

* cited by examiner

METHOD AND APPARATUS FOR GENERATING TERAHERTZ RADIATION WITH MAGNON GAIN MEDIUM AND MAGNON MIRROR

This is a continuation-in-part of the U.S. parent patent application Ser. No. 11/481,197, filed on Jul. 3, 2006 now U.S. Pat. No. 7,430,074 and entitled "GENERATION OF TERAHERTZ WAVES".

TECHNICAL FIELD

The current invention relates to generation of Terahertz waves.

BACKGROUND ART

In the parent patent application entitled "GENERATION OF TERAHERTZ WAVES" the generation of nonequilibrium magnons was used for generation of terahertz waves.

The generation of nonequilibrium magnons can be also described in terms of magnon lasing. In the present patent application the effects of the magnon reflection on the borders of the Magnon Gain Medium (MGM), the concept of magnon mirrors (MM), the effects of time evolution of the magnon distribution function under the condition of electron pumping, and the dynamics of the generated terahertz radiation are introduced and disclosed.

DISCLOSURE OF THE INVENTION

The present invention provides means and methods for generation of THz photons and/or nonequilibrium magnons.

One aspect of the present invention is directed to an apparatus for generation of nonequilibrium magnons. In one embodiment, the apparatus of the present invention for generation of nonequilibrium magnons comprises: (A) a Magnon Gain Medium (MGM), wherein the MGM supports generation of nonequilibrium magnons; (B) at least one magnon mirror (MM); and (C) a means for generating the nonequilibrium magnons in the MGM.

In one embodiment, the apparatus of the present invention for generation of nonequilibrium magnons further comprises: (D) a thermostat, wherein the MGM is placed in the thermostat, and wherein the thermostat is configured to maintain temperature of the MGM below a critical temperature.

In one embodiment of the present invention, the means (A) further comprises: (A1) the MGM selected from the group consisting of: {a ferromagnetic semiconductor; a ferromagnetic insulator; a ferromagnetic material; a ferrimagnetic material; and a magnetic material}.

In one embodiment of the present invention, at least one magnon mirror (MM) further comprises two magnon mirrors (MM).

In one embodiment of the present invention, at least one magnon mirror (MM) further comprises a circular magnon mirror (CMM).

In one embodiment of the present invention, at least one magnon mirror (MM) further comprises an internal magnon mirror (Internal MM). In this embodiment of the present invention, the Internal MM comprises a part of the MGM that is located adjacent to an MGM border.

In one embodiment, the apparatus of the present invention further comprises an external material placed outside of the MGM. In this embodiment of the present invention, at least one magnon mirror (MM) further comprises an external magnon mirror (External MM). In this embodiment of the present invention, the External MM comprises a part of the external material adjacent to the MGM border.

In one embodiment of the present invention, the external material is selected from the group consisting of: {a non-ferromagnetic semiconductor; a non-ferromagnetic insulator; and a non-magnetic material}.

In another embodiment of the present invention, the external material further comprises: a non-magnetic spacer, and an external magnetic material placed adjacent to the spacer. In this embodiment of the present invention, the non-magnetic spacer is placed adjacent to the border of the MGM and separates an exchange coupling within the MGM from an exchange coupling within the external magnetic material.

In one embodiment of the present invention, a magnon mirror (MM) further includes a magnon mirror border (MMB) having the roughness, r; wherein the roughness r of the MMB is smaller than the non-equilibrium magnon wave length $\lambda$.

In one embodiment of the present invention, the magnon mirror border (MMB) comprises the border of the MGM. In another embodiment of the present invention, the magnon mirror border (MMB) is located adjacent to the border of the MGM.

In one embodiment of the present invention, the means (C) further comprises: (C1) a means for pumping nonequilibrium electrons into the MGM, wherein propagation of the nonequilibrium electrons in the MGM causes generation of the nonequilibrium magnons. In another embodiment of the present invention, the means (C) further comprises: (C2) a means for injecting nonequilibrium electrons into the MGM; wherein propagation of the nonequilibrium electrons in the MGM causes generation of the nonequilibrium magnons. In one more embodiment of the present invention, the means (C) further comprises: (C3) a means for injecting nonequilibrium polarized electrons into the MGM; wherein the polarized electrons are polarized in the direction opposite to the direction of magnetization of the MGM; and wherein propagation of the polarized nonequilibrium electrons in the MGM causes generation of the nonequilibrium magnons.

One more aspect of the present invention is directed to an apparatus for generation of nonequilibrium magnons. In one embodiment, the apparatus of the present invention for generation of nonequilibrium magnons comprises: a magnetic film having width L along z-direction and having two facets perpendicular to z-direction, wherein each facet of the magnetic film comprises one magnon mirror (MM); and a means for generating the nonequilibrium magnons in the magnetic film. In this embodiment of the present invention, the width L of the magnetic film is substantially greater than magnon wave length $\lambda$. In this embodiment of the present invention, roughness r of each magnon mirror border (MMB) is substantially smaller than the magnon wave length $\lambda$. In this embodiment of the present invention, a lasing threshold condition for the non-equilibrium magnons is reached if attenuation of the non-equilibrium magnons due to magnon scattering is compensated by generation of the non-equilibrium magnons due to electron-magnon pumping.

Another aspect of the present invention is directed to an apparatus for generation of Terahertz radiation. In one embodiment of the present invention, the apparatus for generation of Terahertz radiation comprises: (A) a Magnon Gain Medium (MGM); and (B) at least one magnon mirror (MM), wherein the MGM supports generation of nonequilibrium magnons, and wherein nonequilibrium magnons are generated in the MGM, and wherein interaction between the non-equilibrium magnons leads to generation of Terahertz photons.

One more aspect of the present invention is directed to an apparatus for generation of Terahertz radiation. In one embodiment of the present invention, the apparatus for generation of Terahertz radiation comprises: a magnetic film having width L along z-direction and having two facets perpendicular to z-direction, wherein each facet of the magnetic film comprises one magnon mirror (MM); and a means for generating the nonequilibrium magnons in the magnetic film, wherein interaction between the nonequilibrium magnons leads to generation of Terahertz photons.

One aspect of the present invention is directed to a magnon resonant cavity having a magnon cavity space area. In one embodiment of the present invention, the magnon resonant cavity comprises: a Magnon Gain Medium (MGM) further comprising a magnon active region, and at least one magnon mirror (MM). In this embodiment of the present invention, the MGM is placed in the magnon cavity space area. In this embodiment of the present invention, the magnon active region is a geometrical area within the magnon cavity space area wherein nonequilibrium magnons are being generated.

One aspect of the present invention is directed to a Terahertz waveguide (TW). In one embodiment of the present invention, the Terahertz waveguide (TW) comprises: a Magnon Gain Medium (MGM) further comprising a magnon active region; two magnon mirrors (MM); and a means for pumping electrons into the MGM. In this embodiment of the present invention, the MGM is placed between two magnon mirrors (MM) that are separated by distance L, wherein each MM is placed in the direction orthogonal to z-direction. In this embodiment of the present invention, each electron emits a non-equilibrium magnon within the magnon active region. In this embodiment of the present invention, when electron pumping rate exceeds the threshold electron pumping rate the non-equilibrium magnons that move along z-direction meet the amplifying condition which leads to an exponential increase in their numbers with time, wherein interaction between the non-equilibrium magnons leads to generation of Terahertz photons. In this embodiment of the present invention, the wave-length of each generated Terahertz photon is much larger than the distance L that separates the two MM, and therefore a substantial number of generated Terahertz photons propagate in the direction orthogonal to z-direction.

One aspect of the present invention is directed to a method for generation of nonequilibrium magnons. In one embodiment, the method of the present invention for generation of nonequilibrium magnons comprises: (A) providing a MGM, wherein the MGM supports generation of nonequilibrium magnons; (B) providing at least one magnon mirror (MM); and (C) generating the nonequilibrium magnons in the MGM.

In one embodiment of the present invention, the step (A) further comprises: (A1) placing the MGM in a thermostat to maintain temperature of the MGM below a critical temperature.

In one embodiment of the present invention, the step (A) further comprises: (A2) selecting the MGM from the group consisting of: {a ferromagnetic semiconductor; a ferromagnetic insulator; a ferromagnetic material; a ferrimagnetic material; and a magnetic material}.

In one embodiment of the present invention, the step (C) further comprises: (C1) pumping nonequilibrium electrons into the MGM; wherein propagation of the nonequilibrium electrons in the MGM causes generation of the nonequilibrium magnons. In another embodiment of the present invention, the step (C) further comprises: (C2) injecting nonequilibrium electrons into the MGM; wherein propagation of the nonequilibrium electrons in the MGM causes generation of the nonequilibrium magnons. In one more embodiment of the present invention, the step (C) further comprises: (C3) injecting polarized nonequilibrium electrons into the MGM, wherein the polarized electrons are polarized in the direction opposite to the direction of magnetization of the MGM, and wherein propagation of the polarized nonequilibrium electrons in the MGM causes generation of the nonequilibrium magnons.

One aspect of the present invention is directed to a method for generation of Terahertz radiation. In one embodiment, the method of the present invention for generation of Terahertz radiation nonequilibrium magnons comprises: (A) providing a MGM; wherein the MGM supports generation of nonequilibrium magnons; (B) providing at least one magnon mirror (MM); and (C) generating the nonequilibrium magnons in the MGM; wherein interaction between the nonequilibrium magnons leads to generation of Terahertz photons.

One more aspect of the present invention is directed to a method for generation of Terahertz radiation. In one embodiment, the method of the present invention for generation of Terahertz radiation nonequilibrium magnons comprises: (A) providing a Magnon Gain Medium (MGM) further comprising a magnon active region; (B) providing two magnon mirrors (MM), wherein the MGM is placed between two magnon mirrors (MM) separated by distance L, and wherein each MM is placed in the direction orthogonal to z-direction; (C) pumping electrons into the MGM, wherein each electron emits a non-equilibrium magnon within the magnon active region, and wherein when electron pumping rate exceeds the threshold electron pumping rate the non-equilibrium magnons that move along z-direction meet the amplifying condition which leads to an exponential increase in their numbers with time; and (D) generating Terahertz radiation due to interaction between the non-equilibrium magnons, wherein the wavelength of each generated Terahertz photon is much larger than the distance L that separates the two MM, and wherein a substantial number of the generated Terahertz photons propagates in the direction orthogonal to z-direction.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference now will be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific-details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of particles and quasi-particles interactions, procedures, equations, blocks, diagrams, and other symbolic representations of physical processes. These descriptions and representations are the means used by those skilled in the art of physics of condensed matter to most effectively convey the substance of their work to others skilled in the art.

A. Introduction

There are a number of crystalline materials that exhibit ferromagnetism (or ferrimagnetism). The table I below lists a representative selection of them here, along with their Curie temperatures, the temperature above which they cease to exhibit spontaneous magnetization.

Ferromagnetic metal alloys whose constituents are not themselves ferromagnetic in their pure forms are called Heusler alloys, named after Fritz Heusler. A ferrimagnetic material is one in which the magnetic moment of the atoms on different sublattices are opposed, as in antiferromagnetism; however, in ferrimagnetic materials, the opposing moments are unequal and a spontaneous magnetization remains. This happens when the sublattices consist of different materials or ions (such as $Fe^{2+}$ and $Fe^{3+}$).

Ferrimagnetic materials are like ferromagnets in that they hold a spontaneous magnetization below the Curie temperature, and show no magnetic order (are paramagnetic) above this temperature. However, there is sometimes a temperature below the Curie temperature at which the two sublattices have equal moments, resulting in a net magnetic moment of zero; this is called the magnetization compensation point. This compensation point is observed easily in garnets and rare earth—transition metal alloys (RE-TM). Furthermore, ferrimagnets may also exhibit an angular momentum compensation point at which the angular momentum of the magnetic sublattices IS compensated. Ferrimagnetism is exhibited by ferrites and magnetic garnets. The oldest-known magnetic substance, magnetite (iron(II,III) oxide; $Fe_3O_4$), is a ferrimagnet; it was originally classified as a ferromagnet before Néel's discovery of ferrimagnetism and antiferromagnetism. Some ferrimagnetic materials are YIG (yttrium iron garnet) and ferrites composed of iron oxides and other elements such as aluminum, cobalt, nickel, manganese and zinc.

TABLE I

Magnetic materials
A selection of crystalline ferromagnetic (* = ferrimagnetic) materials, along with their Curie temperatures in kelvins (K).

| Material | Curie temp. (K) |
|---|---|
| Co | 1388 |
| Fe | 1043 |
| $FeOFe_2O_3$* | 858 |
| $NiOFe_2O_3$* | 858 |
| $CuOFe_2O_3$* | 728 |
| $MgOFe_2O_3$* | 713 |

TABLE I-continued

Magnetic materials
A selection of crystalline ferromagnetic (* = ferrimagnetic) materials, along with their Curie temperatures in kelvins (K).

| Material | Curie temp. (K) |
|---|---|
| MnBi | 630 |
| Ni | 627 |
| MnSb | 587 |
| $MnOFe_2O_3$* | 573 |
| $Y_3Fe_5O_{12}$* | 560 |
| $CrO_2$ | 386 |
| MnAs | 318 |
| Gd | 292 |
| Dy | 88 |
| EuO | 69 |

The present invention is applicable in principle to any magnetic material in which magnons exist, or can be created by external means.

However, the present disclosure is focused on ferromagnetic semiconductors, like EuO. The electrons in a ferromagnetic semiconductor can be divided into two groups: free electrons, which determine the electrical conductivity of the semiconductor, and electrons localized at the ions (d- or f-electrons), which determine its magnetic properties.

The main interaction between these two groups of electrons is the exchange interaction, which lifts the spin degeneracy of the electrons. The conduction (valence band) splits into two subbands with spin up (along the magnetization) and spin down, with an exchange gap $\Delta=2I<S_z>$, where I is the exchange energy of the conduction electrons and the localized spins, and $<S_z>$ is the mean value of the localized spins. At temperatures much lower than the Curie temperature, $T_C$, the mean value of the localized spins $<S_z>$ is temperature independent: $<S_z>=S$.

The exchange gap $\Delta$ is usually larger than 0.1 eV. For example, for EuO the exchange gap is: $\Delta=0.6$ eV. For the reference, please see: J. Lascaray, J. P. Desfours, and M. Averous, Sol. St. Com. 19, 677 (1976).

If the exchange energy is positive, I>0, then the bottom of the subband with spin up is located below the bottom of the subband with spin down. Usually in ferromagnetic semiconductors the gap $\Delta$ is much larger than the maximum of $\{T_C, E_f\}$, where $E_f$ is the Fermi energy of the electrons. Therefore, only the states in the lower subband are occupied in equilibrium, i.e. the electrons are fully polarized.

A nonequilibrium electron put in the upper subband with spin down rapidly emits a magnon, with a large wave vector $q=\hbar^{-1}(2m\Delta)^{1/2}$, where m is the electron effective mass. It follows from the energy and momentum conservation laws that if the energy of this electron, $\epsilon_p$, measured from the bottom of the spin down subband is much smaller than $\Delta$, the wave vector of the emitted magnon, q lies in the interval $q_1 \leq q \leq q_2$, where $q_{1,2}=\hbar^{-1}(p_0 \pm p)$, $p_0=(2m\Delta)^{1/2}$, $p=(2m\epsilon_p)^{1/2}<<p_0$. The frequency of these magnons may be in the Terahertz region.

For EuO, the values of electron mass m are inconsistent according to different references. According to one reference, (J. Shoenes and P. Wachter, Phys. Rev. B 9, 3097 (1974)), $m=0.35 m_0$, $m_0$ is the free electron mass, and the wave vector of the excited magnons $q=q_0=\hbar^{-1}p_0=2.6 \ 10^7 \ cm^{-1}$. The spin-wave stiffness $D=10.8 \ 10^{-16}$ mev $cm^2$. (L. Passel, O. W. Dietrich and J. Als-Nielsen, Phys. Rev. B 14, 4897, 1976).

This gives the energy of the excited magnons $\hbar^{-1}\omega = Dq^2 = 0.73$ meV, and the frequency $f_m = \omega/2\pi = 0.19$ THz. Merging of two magnons with frequency f and wave vectors $\vec{q}$ and $(-)\vec{q}$ generates a photon with frequency 2f (for the reference, please see M. I. Kaganov and V. M. Tsukernik, Sov. Phys.—JETP 37, 587 (1960)). Thus, in the above given example, the frequency of the emitted radiation is: $f_r = 2f_m = 0.38$ THz.

On the other hand, according to another reference (I. Ya. Korenblit, A. A. Samokhvalov and V. V. Osipov, in Sov. Sc. Rev. A, Physics, 8, 447. Harwood Ac. Publ., UK, 1987), the electron mass value in EuO is quite different: $m = 1.5\, m_0$. If this is the case, one obtains a quite different value for the radiation frequency: $f_r = 1.6$ THz.

More generally, consider a ferromagnetic semiconductor with $\Delta = 0.2$ eV, and $m = 0.3\, m_0$. Then we have $q_0 = 1.4\,10^7$ cm$^{-1}$. The magnon frequency $\hbar^{-1}\omega(q_0) = kTc\,(q_0 a)^2$, where k is the Boltzman constant, and a is the lattice constant. With $T_c \approx 100\text{-}300$ K and $\alpha = 3\text{-}5 \times 10^{-8}$ cm, the magnon frequency is $f_m = 1.6$ THz, and the radiation frequency $f_r = 2.0$ THz.

The ratio of the magnon generation rate, $\Gamma_e(\vec{q})$, to the rate of $\Gamma_m(\vec{q})$, their relaxation (in collisions with equilibrium magnons) is a function of the wave vector $\vec{q}$. Therefore the nonequilibrium magnon distribution function, $N(\vec{q})$ has a maximum at some wave vector $\vec{q} = \vec{q}^*$. $N(\vec{q})$ increases with the increase of the electron pumping, and because of the simulated emission of magnons, the function $N(\vec{q})$ grows most rapidly at $\vec{q}$ close to $\vec{q}^*$. When the pump reaches some critical value, $N(\vec{q}^*)$ starts to increase very fast with the increase of the electron pumping. At some conditions the generation of magnons with $\vec{q} = \vec{q}^*$ becomes avalanche-like, and the magnon system becomes unstable. For more details, please see references: I. Ya. Korenblit and B. G. Tankhilevich, Sov. Phys.—JETP, 46, 1167 (1977); I. Ya. Korenblit and B. G. Tankhilevich, Sov. Phys.—JETP Lett. 24, 555 (1976); I. Ya. Korenblit and B. G. Tankhilevich, Phys. Lett. A 64, 307 (1977), and equations below. As a result an intense Terahertz radiation can be obtained.

B. Dynamics of a Magnon Laser

The time evolution of the magnon distribution function under the conditions of electron pumping can be dealt without evoking the optical laser theory, since the basic transport equations which govern the behavior of the electron, $f_\downarrow(\vec{q})$, and magnon, $N(\vec{q})$ distribution functions give the same results. These basic non-stationary transport equations (obtained in the following paper: I. Ya. Korenblit and B. G. Tankhilevich, Sov. Phys.—JETP, 46, 1167 (1977)) are as follows:

$$\partial N(\vec{q})/\partial t = [1+N(\vec{q})]\Gamma_e(\vec{q}) - [N(\vec{q}) - N^{(0)}(\vec{q})]\Gamma_{ms}(\vec{q}) \quad \text{(Eq. 1)}$$

$$\partial f_\downarrow(\vec{p})/\partial t = g(\epsilon_p) - f_\downarrow(\vec{p})\gamma_{em}(\vec{p}) \quad \text{(Eq. 2)}$$

The function $g(\epsilon_p)$ is the generation function of electrons, with spin down.

Here $\Gamma_e(\vec{q})$ is the rate of relaxation of magnons in collisions with electrons $$\Gamma_e(\vec{q}) = 4\pi \hbar^{-1}{}_{-1}I^2 S v_0 \int d^3 p (2\pi \hbar^{-1})^{-3} \delta(\gamma_\uparrow(\vec{p} - \hbar^{-1}\vec{q})|\epsilon$$
$$\vec{p}\downarrow - \hbar^{-1}\omega_{\vec{q}^-} - \epsilon_{\vec{p}^-} \hbar^{-1}{}_{\vec{q},\uparrow})f_\downarrow(\vec{p}), \quad \text{(Eq. 3)}$$

where $v_0$ is the unit cell volume.

$\gamma_{em}$ is the electron-magnon relaxation rate:

$$\gamma_{em}(\vec{p}) = 4\pi \hbar^{-1}{}_{-1}I^2 S v_0 \int d^3 q (2\pi \hbar^{-1})^{-3} \delta(\gamma_\uparrow(\vec{p} - \hbar^{-1}\vec{q})|\epsilon$$
$$\vec{p}\downarrow - \hbar^{-1}\omega_{\vec{q}^-} - \epsilon_{\vec{p}^-} \hbar^{-1}{}_{\vec{q},\uparrow})(1+N(\vec{q})), \quad \text{(Eq. 4)}$$

The smeared $\delta$-function, $\delta(\gamma|\epsilon)$, takes into account the finite lifetime of the electrons in the final state, caused by the interaction with optical phonons, which may be strong in ferromagnetic semiconductors, with an essential ionicity contribution to the chemical bonds. We have $$\delta(\gamma|\epsilon) = \frac{1}{\pi}\frac{\hbar\gamma}{(\epsilon^2 + \hbar^2\gamma^2)} \quad \text{(Eq. 5)}$$

The rate $\gamma_\uparrow(p,\epsilon_p)$ is the known electron damping rate due to the emission of longitudinal optical phonons. For electrons with energy $\epsilon_p$ close to $\Delta$, this rate is given by $$\gamma_8(\epsilon_p) = (\pi/2)\alpha\Omega(\Omega/\Delta)^{1/2}\ln(4\Delta/\Omega) << \Delta. \quad \text{(Eq. 6)}$$

Here $\Omega$ is the energy of an optical phonon, and $\alpha$ is the strength of the electron-phonon interaction.

The relaxation rate of the magnons to the equilibrium value $N^{(0)}$ is given by $$\Gamma ms(\vec{q}) = \Gamma m(\vec{q}) + \Gamma s(\vec{q}) \quad \text{(Eq. 7)}$$

It includes both magnon-magnon scattering, $\Gamma m(\vec{q})$, and scattering of magnons on the surface, $\Gamma s(\vec{q})$. Putting the time derivatives and $\Gamma s$ to zero, we came back to equations of parent application which describe the steady state of the magnon system without surface scattering.

The rate $\Gamma s$ can be obtained from the following arguments. We have by definition $$\left(\frac{\partial(N - N^{(0)})}{\partial t}\right)_s = -(N - N^{(0)})\Gamma s \quad \text{(Eq. 8)}$$

The l.h.s. gives the change with time of N due to the surface scattering. The solution of this equation is $$(N - N^{(0)}) \propto \exp(-\Gamma st). \quad \text{(Eq. 9)}$$

On the other hand, when scattered on a surface, the SW intensity is lowered by a factor $R \leq 1$, R being the reflection coefficient, while the time it travels until it reaches the surface is L/s, where L is the sample dimension and s is the SW velocity. Thus, one should have $$\exp(-\Gamma s L/s) = R. \quad \text{(Eq. 10)}$$

This gives $\Gamma s = (s/L)\ln(1/R)$. If the SW travels between two surfaces, with reflection coefficients R1 and R2, separated by the distance L, then $\Gamma s$ is given by $$\Gamma s = (s/L)\ln(1/R_1 R_2). \quad \text{(Eq. 11)}$$

The electron-magnon relaxation rate yem is very large, of order $3\,10^{12}\text{-}10^{13}$ sec$^{-1}$. Thus, after a very short time of order $\gamma_{em}^{-1}$ the electron distribution function according to Eq. (2), reaches the value $$f_\downarrow(\vec{p}) = g(\epsilon_p)/\gamma_{em}(\vec{p}) \quad \text{(Eq. 12)}$$

It follows from this equation and Eqs. (3 and 4):

$$\Gamma_e(\vec{q}) = \int d^3p\, g(\epsilon_p)\delta(\gamma_{556}(\vec{p} - \hbar^{-1}\vec{q}))|\epsilon_{\vec{p}\downarrow} - \hbar^{-1}\omega_{\vec{q}} -$$
$$\epsilon_{\vec{p}-\hbar^{-1},\uparrow}|Z^{-1}(\vec{p}), \quad \text{(Eq. 13)}$$

$$Z(\vec{p}) = \int d^3q\, \delta(\gamma_\uparrow(\vec{p}-\hbar^{-1}\vec{q}))|\epsilon_{\vec{p}\downarrow} - \hbar^{-1}\omega_{\vec{q}} -$$
$$\epsilon_{\vec{p}-\hbar^{-1}_{\vec{q}},\uparrow}|(1+N(\vec{q})), \quad \text{(Eq. 14)}$$

where $\gamma_\uparrow$ is the damping rates of electrons in the subband with spin up, due to emission of optical phonons (see Eq. (6)).

These equations Eqs. (13 and 14) together with Eq. (1) give an integro-differential equation for N (q, t) We solve it in the limits of small and large t assuming that the temperature, T, is low, $kT << \hbar^{-1}\omega(\vec{q}_0)$ and therefore $N(\vec{q},0) = N^{(0)}(\vec{q})$ is much smaller than unity.

Consider not too large times, when $N(\vec{q})$ is also small, $N(\vec{q}) << 1$. Then (Eq. 1) transforms into a simple differential equation $$\partial N(\vec{q})/\partial t = \Gamma_e^*(\vec{q}) - [N(\vec{q}) - N^{(0)}(\vec{q})]\Gamma_{ms}(\vec{q}) \quad \text{(Eq. 15)}$$

with $\partial_e^*(\vec{q})$ given by (Eq. 13) in which the function Z does not depend on $N(\vec{q})$:

$$Z(\vec{p}) = \int d^3q\, \delta(\gamma_\uparrow(\vec{p}-\hbar^{-1}\vec{q}))|\epsilon_{\vec{p}\downarrow} - \hbar^{-1}\omega_{\vec{q}} - \epsilon_{\vec{p}-\hbar^{-1}_{\vec{q}},\uparrow}|. \quad \text{(Eq. 16)}$$

The solution of (Eq. 15), with the initial condition $N(\vec{q},0) = N^{(0)}(\vec{q})$, is $$N(\vec{q},t) = (N^{(0)}(\vec{q}) - \Gamma_e^*(\vec{q})/\Gamma_{ms}(\vec{q}))\exp(-\Gamma_{ms}(\vec{q})t) + \Gamma_e^*(\vec{q})/\Gamma_{ms}(\vec{q}) \quad \text{(Eq. 17)}$$

This solution holds only at such t, when the condition N<1 is satisfied. It is seen that if the ratio $\Gamma_e^*/\Gamma_{ms}$ is less than unity, N changes from $N^{(0)}$ at t=0 till:

$$N(\vec{q}) = \Gamma_e^*(\vec{q})/\Gamma_{ms}(\vec{q}) \quad \text{(Eq. 18)}$$

at t larger than $\Gamma^{-1}_{ms}$, being always small.

Thus, in this case only spontaneous emission of magnons is important. In the stationary state given by (Eq. 18), N (q) increases linearly with the pumping.

If $\Gamma_e^*/\Gamma_{ms}$ exceeds one, the solution of (Eq. 17) is valid only at $t << \Gamma^{-1}_{ms}$, when N remains small. When N reaches a value of order unity, the stimulated emission dominates. Thus, the threshold pumping for a fast increase of N (q) caused by the stimulated emission can be written as $$\Gamma^*e = \Gamma m + (s/2L)\ln(1/R_1 R_2). \quad \text{(Eq. 19)}$$

The same condition follows from the arguments borrowed from the theory of optical lasers. The larger the pumping the less delay time it takes for the stimulated emission to become dominant.

We calculate $\Gamma_e^*$ for two types of pumping:

$$g(\epsilon_p) = g_0 \epsilon \delta(\epsilon - \epsilon_p).$$

$$g(\epsilon_p \leq \epsilon) = g_0; \; g(\epsilon_p > \epsilon) = 0. \quad \text{(Eq. 20)}$$

It was shown in the paper by I. Ya. Korenblit and B. G. Tankhilevich, Sov. Phys.—JETP, 46, 1167 (1977) that (i) $\hbar^{-1}\gamma_\uparrow$ is of order of 0.06 eV, and that (ii) the smeared δ-function in Eqs (9) and (12) may be replaced by a true one, if the inequality $\epsilon >> \gamma^2_\uparrow/4\Delta \approx 0.001$ eV holds. On the other hand, $\epsilon$ should be smaller than the energy of the optical photon, which in EuO is 0.08 eV. Hence, there is a large energy interval, where the damping of the electrons in the final state can be neglected. It follows, (from Eqs. (13 and 16)) that $\Gamma^*e$ is the same for both types of pumping given by (Eq. 20):

$$\Gamma^*e = g_0 \epsilon/4\Delta. \quad \text{(Eq. 21)}$$

It also follows (from (Eqs. (21 and 19)) that the threshold pumping is given by $$g_0 = g_{th} = (4\Delta/\epsilon)(\Gamma m + (s/2L)\ln(1/R_1 R_2)). \quad \text{(Eq. 22)}$$

If the pumping exceeds the above-given threshold, the full integro-differential equation for N (q, t) should be solved. There are some semi-quantitative arguments, which could explain the time dependence of N in this case.

Suppose that the pumping is isotropic. Than, as was shown in the paper by I. Ya. Korenblit and B. G. Tankhilevich, Sov. Phys.—JETP, 46, 1167 (1977), the function Z increases with the increase of the pumping in such a way, that Γe is always smaller than Γms, being close to it at sufficiently strong pumping $g_0 > gc = 4(\Delta/\epsilon)^{1/2} g_{th} >> g_{th}$. At such pumping the system is in a stationary state, with N(q) increasing exponentially with pumping. In other words, it is the feedback relationship between the magnon emission rate and the population of the subband with spin down (see (Eqs. 2 and 4)), which leads to the stationary state at sufficiently large t. The solution of equations (Eqs. 1 and 2) shows that stationary state exists only when the condition Γe<Γms, is met (please, also see the parent patent application):

$$N(\vec{q}) = (N^0(\vec{q}) + \Gamma_e(\vec{q})/\Gamma_{ms}(\vec{q}))(1 - \Gamma_e(\vec{q})/\Gamma_{ms}(\vec{q}))^{-1}. \quad \text{(Eq. 23)}$$

The t-dependence of N is quite different, if the magnon emission owing to the anisotropy of the coefficients in (Eq. 1) or due to the technical construction of the system, is anisotropic, i.e. $N(\vec{q}, t)$ increases mainly at $\vec{q}$ in the vicinity of some $\vec{q}*$ (there may exist several such optimal vectors). Then the function Z, which is an average of $N(\vec{q}, t)$, is not very sensitive to the value of $N(\vec{q}*, t)$, and the feedback relationship discussed above is not effective. Therefore, Γe can be considered as time independent even in the case, when $N((\vec{q}*,t)$ is large. The solution of (Eqs. 1 and 2) is as follows:

$$N^{(0)}(\vec{q}*,t) = N^{(0)}(\vec{q}) + (\Gamma_e(1+N^{(0)})/(\Gamma_e - \Gamma_{ms}))[\exp((\Gamma_e - \Gamma_{ms})t) - 1]. \quad \text{(Eq. 24)}$$

Thus, $N(\vec{q}*,t)$ increases exponentially with time, if $g_0$ exceeds $g_{th}$. At some point in time, when N becomes very large the feedback may cause the system to enter into an anisotropic magnon stationary state when the anisotropy conditions are met.

It was also shown in the paper by I. Ya. Korenblit and B. G. Tankhilevich, Sov. Phys.—JETP, 46, 1167 (1977), that even a small anisotropy in the magnon spectrum results in infinite increase in N, when $\vec{q}$ is directed along the magnetization. But since the anisotropy was assumed to be small, this kind of behavior is evident only at a very strong pumping.

Figure 1:
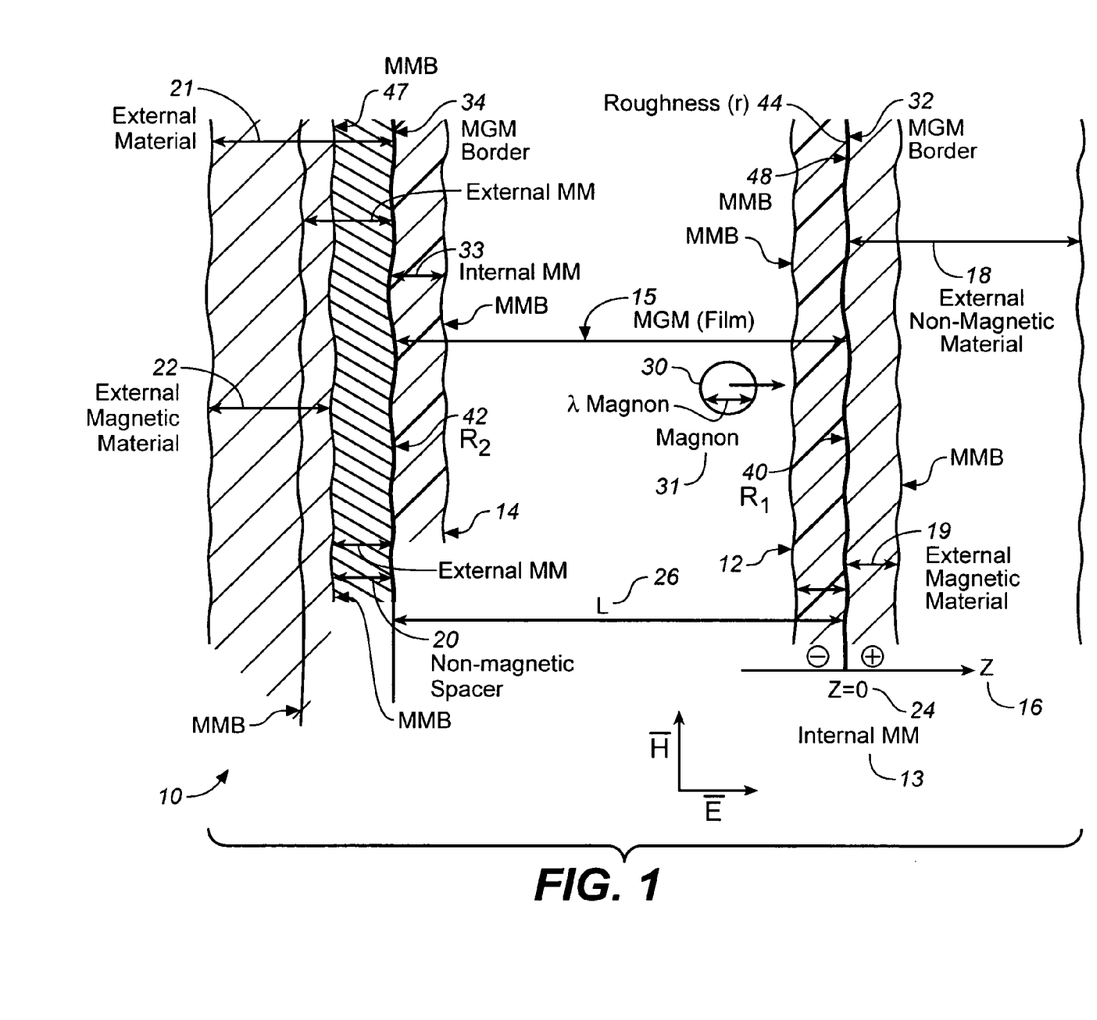
FIG. 1 illustrates the concept of magnon mirrors for the purposes of the present invention.

One can get a strong anisotropy of the magnon emission by employing two magnon mirrors 12 and 14 with Magnon Gain Medium (MGM) 15 placed in between, as shown in FIG. 1.

These magnon mirrors 12 and 14 also serve as a magnon resonant cavity, and when $g_0$ exceeds $g_{th}$, only the magnons that move perpendicular to the mirrors meet the amplifying condition which leads to an exponential increase in their numbers with time. (Please, see the detailed disclosure of the concept of magnon mirrors below).

The developed herein theory is strictly applicable if the magnon gain occurs homogeneously in the crystal. The mean free path of electrons with respect to magnon emission $l_{em}$ is of order of $10^{-8}$ m. This means that the electrons preserve their spin down only in a smooth stripe close to the surface. The width of the magnon gain region (or of the active region 15 using the laser terminology) is of order of $10^{-8}$ m.

C. Spin-Wave Reflection and Magnon Mirrors

In one embodiment of the present invention, FIG. 1 illustrates the concept 10 of magnon mirrors (MM) 12 and 14 for the purposes of the present invention.

In one embodiment of the present invention, let us suppose that z-axis 16 is directed perpendicular to the MGM border 32 (of the MGM comprising MGM film 15), which separates MGM film 15 and an external non-magnetic material 18.

In another embodiment of the present invention, the magnon mirror (MM) 14 is adjacent to a non-magnetic spacer 20 that separates MGM film 15 and the external magnetic material 22, wherein MGM film 15 and external magnetic material 22 are having different exchange couplings. The exchange interaction, j between spins across the MGM border 34 is small in comparison with the exchange inside the MGM 15.

Consider MGM film 15 of thickness L 26 which satisfy the inequality $L \gg \lambda$, where $\lambda$ 30 is the wave length of a spin-wave (SW) (magnon) 31. Based on the estimations given in the parent patent application, depending on the value of the effective electron mass we choose, the spin-wave (SW) wave length 30 is:

$$\lambda = 5 \cdot 10^{-9} \text{ m} - 2.5 \cdot 10^{-9} \text{ m}.$$

Consider the reflection of the SW (magnon) 31 from MGM borders 32 and 34. Since L 26 is much larger than $\lambda$ 30, it is sufficient to consider the magnon reflection from one MGM border 32.

The transverse components of the magnetization, in the MGM film 15 satisfy the equation $$(-)\partial m/\partial t = D(z) \Delta m. \quad \text{(Eq. 25)}$$

Here $m = m_\zeta + im_\eta$, the axes $\zeta$ and $\eta$ being perpendicular to the magnetization direction, $\Delta$ is the Laplace operator. The stiffness $D(z)$ is: $D(z) = D_1$ at $z<0$, and $D(z) = D_2$ at $z>0$. We neglect in this equation terms, which depend on the direction of the magnetization, since we are interested in high-frequency SW. It follows from (Eq. 25) that the SW spectrum is: $\omega_q^{\rightarrow} = D_1 q^2$ in the subspace $z<0$, and $\omega_q^{\rightarrow} = D_2 q^2$ in the subspace $z>0$, wherein the origin 24 $z=0$ of z axes 16 is placed at the MGM border 32.

The transverse magnetization m in the case $j=0$ satisfies the following border condition $$m_k \big|_{z=0} + C \frac{\partial m_k}{\partial z} \big|_{z=0} = 0, \quad \text{(Eq. 26)}$$

where k=1, 2.

Here the coefficient C is of order of the ratio of the exchange interaction to the surface anisotropy energy. If the surface anisotropy is not too large and the spatial derivative in the second term of this equation is not too small, the first term may be neglected, and one arrives at the border condition $$\frac{\partial m_k}{\partial z} \bigg|_{z=0} = 0. \quad \text{(Eq. 27)}$$

In our case short wave length SW are considered. Therefore, the special derivative is large, and the approximation leading to Eq. (27) is valid. If j is finite, a term proportional to $j(-1)^k(m_1-m_2)$ should be added to the l.h.s. of Eq. (27).

It was shown by Reshetnyak [Fiz. Nizk. Temp. 30, 398 (2004) (Low Temp. Phys. 30, 295 (2004))] that reflection coefficient of SW from the border z=0 (24) is given by $$R = \left| \frac{f_1(\theta) - i(j/J)f_2(\theta)}{f_1(\theta) - i(j/J)f_3(\theta)} \right|^2. \quad \text{(Eq. 28)}$$

Hear $f_1$, $f_2$ and $f_3$ are some functions of the incidence angle $\theta$, while $f_3 > f_2$, and J is the exchange between spins inside the ferromagnetic, which is supposed to be the same in both ferromagnetic.

Putting j to zero (no exchange across the interface) one gets $R = R_1$ (40)=1 independent on $\theta$. This result is evident, taking into account that the SW cannot propagate in a non-magnetic media 18. If j is small, $j \ll J$, (as in the case of reflection on the MGM border 34) than $R = R_2$ (42)=1-$A(\theta)(j/J)^2$, where A is of order of unity.

The average roughness, r, is defined as an absolute value of the surface height averaged over the surface. Note that for the geometrical optics to be valid, the roughness, r 44, of the border (interface) 32 should be smaller than the SW length $\lambda$ 30. Thus, the following inequalities should be satisfied:

$r$(the roughness 44 of the MGM border 32)$\ll \lambda$(the spin-wave 31 (SW) wave length 30)$\ll L$(the thickness 26 of MGM film 15). (Eq. 29)

D. Magnon Lasing and Optical Lasers

Figure 2:
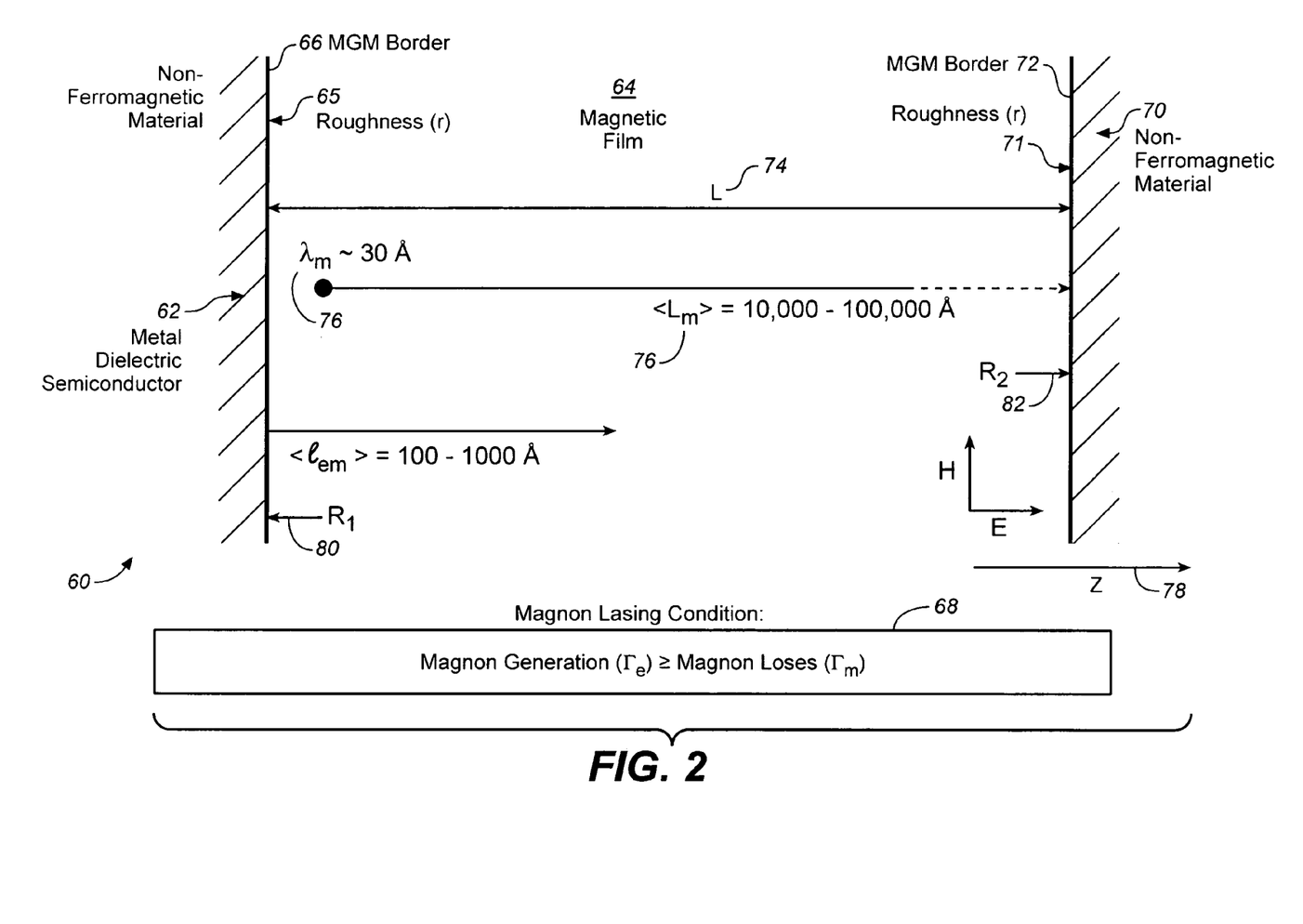
FIG. 2 shows the magnon laser whereas the magnon lasing condition is reached by employing MGM and two magnon mirrors of FIG. 1 for the purposes of the present invention.

In one embodiment of the present invention, FIG. 2 shows the magnon laser system 60 described in the paper by I. Ya. Korenblit and B. G. Tankhilevich, Sov. Phys.—JETP, 46, 1167 (1977) and in the parent patent application, plus the magnon mirrors 66 and 72, whereas the magnon lasing condition 68 is reached by employing magnon mirrors 66 and 72.

In one embodiment of the present invention, as depicted in FIG. 2, we assume that the MGM material comprises a magnetic film 64 with the width L 74, much larger than the magnon wave length $\lambda$ 76. We assume herein that the two facets 66 and 72 of the magnetic film 64 perpendicular to z-direction 78 serve as magnon mirrors (MM) 66 and 72.

The lasing threshold condition for the spin wave (SW) (or magnon) is to make a round trip traversal to the magnon mirrors 66 and 72 without overall loss, wherein attenuation of non-equilibrium magnons due to magnon scattering is compensated by generation of non-equilibrium magnons due to electron-magnon pumping.

The intensity of the SW after the trip, I (2L), is related to the intensity at the beginning of the trip, I(0), by the equation $$I(2L) = I(0) R_1 R_2 \exp[2L(\eta(q) - \alpha(q))] \quad \text{(Eq. 30)}$$

Here $R_1$ 80 and $R_2$ 82 are the reflection coefficients from the two mirrors 66 and 72 (respectively), $\eta(q)$ and $\alpha(q)$ are the generation and attenuation rates of SW with wave-vector q. In other words, $1/\alpha$ is the SW mean free path, l, and $1/\eta$ is the generation length.

The similar relationship is used in the optical laser theory. Its physical meaning seems evident.

In our notations η(q) is the generation rate of the magnons, Γe divided by the magnon velocity, while α(q) is the magnon damping rate Γm divided by the magnon velocity Thus, from Eq. (30) the following relationship for the threshold generation rate follows:

$$\Gamma_e^{th}(q) = \Gamma m(q) + (s/2L)\ln(1/R_1 R_2). \tag{Eq. 31}$$

Let us consider the same model as in the parent patent application. The rate $\Gamma_e(q)$ is given by equations (Eq. 13) and (Eq. 14).

With R1=R2=R<1, we get (see Section B)

$$g_{th} = (4\Delta/\epsilon)(\Gamma m + (s/L_z)\ln(1/R)). \tag{Eq. 32}$$

The last term in the r.h.s. of this equation can be neglected if the inequality ln $R^{-1} \ll L/L_m$ holds. If L 74 is of order or larger than $L_m$ 76 (magnon free path), this inequality holds even if R ($R_1$ and/or $R_2$) is essentially smaller than unity. Note that with magnon-magnon damping rate $\Gamma m = 10^8 - 10^9$ sec$^{-1}$, and the magnon velocity s=$10^3$ m/sec, the magnon mean free path is $L_m = s/\Gamma m = 10^{-5} - 10^{-6}$ m.

Figure 3:
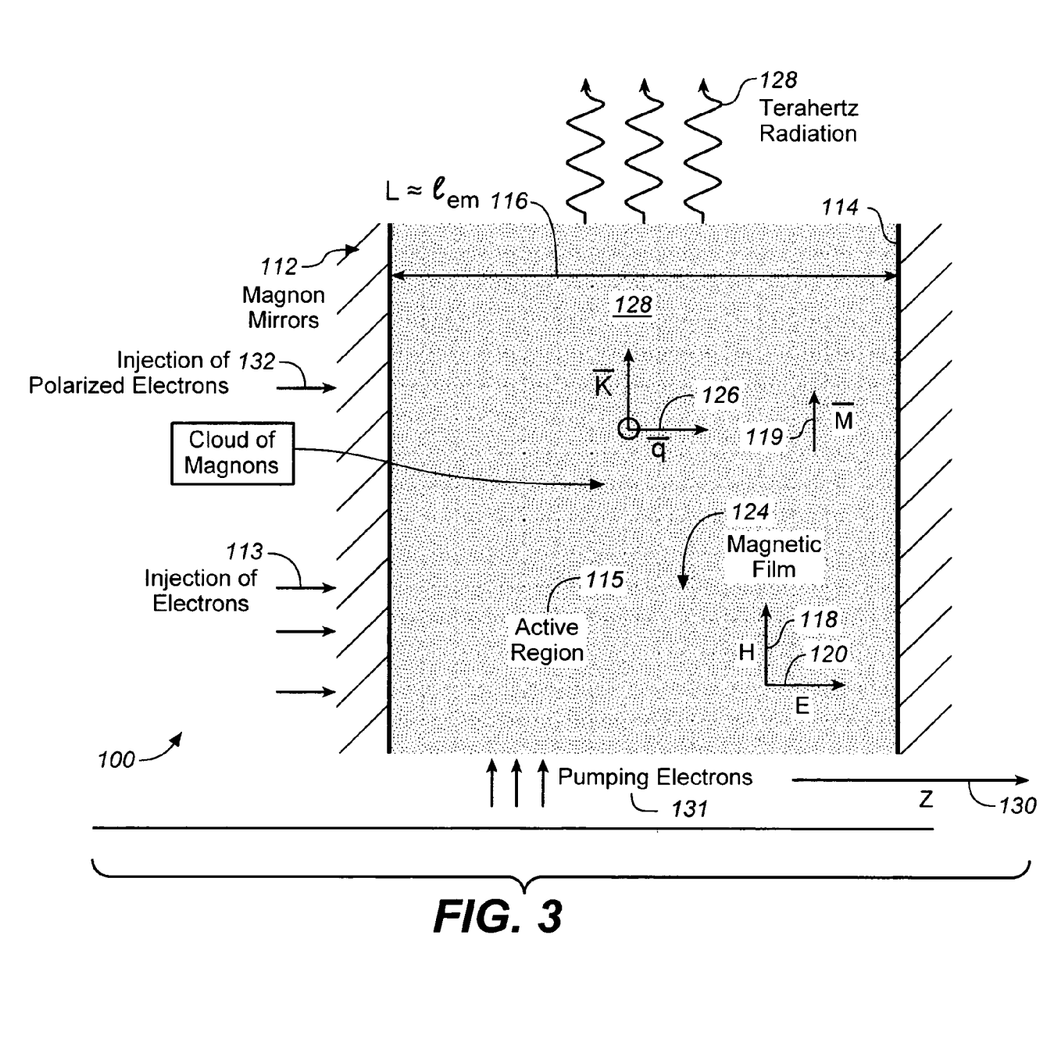
FIG. 3 illustrates one embodiment of the present invention wherein a strong anisotropy of the magnon emission is obtained by employing two magnon mirrors with MGM including an active region in between, and whereas the separation between two magnon mirrors is much smaller than the magnon free path.

Note that in addition to the lasing conditions 68 of FIG. 3 ((Eq. 31) or (Eq. 30)), there is one more condition, which follows from the requirement that the phase of the SW does not change after the round trip of 2L. Only the intensity of SW with wave vector q satisfying the condition $$Lq = \pi m, \tag{Eq. 33}$$

where m is an integer, will be amplified. This is not a strong restriction, since the wave-vectors q of the generated SW fall in the interval q1<q<q2, and Lq is large.

In one embodiment of the present invention, FIG. 3 illustrates an embodiment of the present invention 100 wherein a strong anisotropy of the magnon emission is obtained by employing two magnon mirrors 112 and 114 with MGM 124 (comprising a magnetic film 124 and having an active region 115) in between, whereas the thickness L 116 of the magnetic film (L≈$l_{em}$) is much smaller than the magnon free path $L_m$; wherein $l_{em}$ is a free path of the injected electrons 113 in respect to emission of non-equilibrium magnons 126.

E. Generation of Terahertz Radiation

As was fully disclosed in the parent patent application, merging of two non-equilibrium magnons with wave vectors q and q' generates a photon with wave vector $$\vec{k} = \vec{q} + \vec{q}' \tag{Eq. 34}$$

and with frequency $v_k$ equal to $$\omega_q + \omega_{q'} = v_k = ck, \tag{Eq. 35}$$

where c is the light velocity.

It follows from these conservation laws that k is much smaller than q, i.e. $\vec{q} = -\vec{q}'$.

Referring still to the embodiment of the present invention shown in FIG. 3, the employment of magnon mirrors 112 and 114 has some additional and important advantages. Indeed, suppose that the magnetic moment $\vec{M}$ 119 is directed along the magnetic field $\vec{H}$ 118 and along the magnon mirrors 112 and 114. Then the wave-vectors of magnons $\vec{q}$ 126 generated beyond the critical pumping, are perpendicular to the magnetization $\vec{M}$ 119, which is the optimal condition for photon generation. Since the wave-length of the THz photons is much larger than L (116 of FIG. 3), the THz photons having wave vectors $\vec{k}$ 128 can propagate only along the mirrors 112 and 114. This allows generation of an intensive ray of THz photons 128.

F. Dynamics of Terahertz Radiation

Using the results of the paper by M. I. Kaganov and V. M. Tsukernik, Sov. Phys.—JETP 37, 587 (1960), one can derive the rate of the change of the photon distribution function, n(v) in the following way:

$$dn(v)/dt = \tag{Eq. 36}$$
$$W \int d\theta \cdot \sin^5\theta [N^2(v/2,\theta) \cdot (n(v)+1) - n(v)(N(v/2,\theta)+1)^2] - \frac{n(v) - n^{(0)}(v)}{\tau_{ph}},$$

Here $$W = \frac{\mu^2 q_0^3}{2\hbar} \cdot \left(\frac{4\pi g \mu M_s}{\hbar v}\right)^2, \tag{Eq. 37}$$

where μ is the Bohr magneton. The last term in the (Eq. 36) describes the relaxation of generated photons, and $\tau_{ph}$ is the photon relaxation time.

Consider the generation of THz photons $\vec{k}$ 128 (of FIG. 3) along the magnetization $\vec{M}$ 119 by magnons with $\vec{q}$ 126 almost perpendicular to the magnetization $\vec{M}$ 119, and suppose that the number of these magnons N increases exponentially with time according to Eq. (24).

$$N(\theta,t) \propto \exp(\beta t). \tag{Eq. 38}$$

Here θ is the angle (not shown) between $\vec{q}$ 126 and the magnetization $\vec{M}$ 119, $$\theta \approx \pi/2, \text{ and } \beta = \Gamma_e - \Gamma_{ms}.$$

If this is the case, the integration in Eq. (36) takes place over a small region δθ in the vicinity of π/2. One may, therefore put sin θ=1, and ignore the dependence of N on θ. Thus, Eq. (36) can be rewritten as follows:

$$\frac{dn}{dt} = \tilde{w}N^2(t) - n[\tilde{w}2N(t) + \tilde{w} + \tau_{ph}^{-1}], \tag{Eq. 39}$$

where $\tilde{w} = W\delta\theta$.

The exponential dependence (38) holds, when the stimulated emission governs the generation of magnons, i.e. when N is large, N>>1. It is also assumed that at such times the number of generated photons exceeds their equilibrium value, and thus in Eq. (30) a term proportional to $n^{(0)}$ is omitted. The equation (39) can be solved in two limiting approximations.

A. If $\tilde{w}N\tau_{ph} \ll 1$, Eq. (39) can be rewritten as follows:

$$\frac{dn(t)}{dt} + \frac{n(t)}{\tau_{ph}} = \tilde{w}N^2(t). \tag{Eq. 40}$$

The solution of this equation is as follows:

$$n(t) = \frac{\tilde{w}\tau_{ph}N^2(t)}{2\beta\tau_{ph}+1}. \quad \text{(Eq. 41)}$$

In this regime, which is realized when N is not too large, but N is much larger than unity, n may be smaller than 1, if $\tilde{w}\tau_{ph}N^2$ is small, or larger than 1, if the opposite inequality holds.

B. If $\tilde{w}N\tau_{ph} \gg 1$, Eq. (39) can be rewritten as follows:

$$\frac{dn(t)}{dt} + 2\tilde{w}N(t)n(t) = \tilde{w}N(t)^2. \quad \text{(Eq. 42)}$$

The solution of this equation is as follows:

$$n(t)=N(t)/2+O(1) \quad \text{(Eq. 43)}$$

This solution resembles the solution in a stationary state: all magnons merge to generate photons, but now the number of photons increases exponentially with time, as the number of magnons does.

G. Bandwidth of the Generated Terahertz Radiation

Due to electron optical phonons damping in an electron final state the magnons beyond the range of q1<q<q2 are also amplified initially at low electron pumping rates. However, due to the simulated radiation only a single magnon mode is selected. Thus, the bandwidth (BW) of the radiated THz photons 128 (of FIG. 3) is inversely proportional to the magnon—magnon damping of the selected mode which is $10^8$–$10^{-9}$ sec$^{-1}$. However, at sufficiently low temperatures the rate of magnon—magnon damping (due to 3-magnon relativistic processes) can be as low as $10^{-6}$–$10^{-7}$ sec$^{-1}$, that is the BW of Terahertz radiation can be as low as $10^6$–$10^7$ Hz (about 1 MHz in the best case scenario).

H. Additional Embodiments

In one embodiment, the apparatus of the present invention for generation of nonequilibrium magnons comprises: (A) a Magnon Gain Medium (MGM) (15 of FIG. 1), wherein the MGM supports generation of nonequilibrium magnons; (B) at least one magnon mirror (MM) (12 and/or 14 of FIG. 1); and (C) a means for generating the nonequilibrium magnons in the MGM (not shown).

In one embodiment, the apparatus of the present invention for generation of nonequilibrium magnons further comprises: (D) a thermostat (not shown), wherein the MGM is placed in the thermostat, and wherein the thermostat is configured to maintain temperature of the MGM below a critical temperature.

In one embodiment of the present invention, the MGM (15 of FIG. 1) is selected from the group consisting of: {a ferromagnetic semiconductor; a ferromagnetic insulator; a ferromagnetic material; a ferrimagnetic material; and a magnetic material}.

In one embodiment of the present invention, as shown in FIG. 1, at least one magnon mirror (MM) further comprises two magnon mirrors (MM) 12 and 14.

In one embodiment of the present invention, at least one magnon mirror (MM) further comprises a circular magnon mirror (CMM) (not shown).

In one embodiment of the present invention, at least one magnon mirror (MM) further comprises an internal magnon mirror (Internal MM) (13 and/or 33 of FIG. 1). In this embodiment of the present invention, the Internal MM 13 (and/or 33) comprises a part of the MGM 15 that is located adjacent to an MGM border 32 (and/or 34 respectively).

In one embodiment, as shown in FIG. 1, the apparatus of the present invention 10 further comprises an external non-magnetic material placed 18 outside of the MGM 15. In this embodiment of the present invention, at least one magnon mirror (MM) further comprises an external magnon mirror (External MM) 19. In this embodiment of the present invention, the External MM 19 comprises a part of the external non-magnetic material 18 adjacent to the MGM border 32.

In one embodiment of the present invention, the external non-magnetic material 18 (of FIG. 1) is selected from the group consisting of: {a non-ferromagnetic semiconductor; a non-ferromagnetic insulator; and a non-magnetic material}.

In another embodiment of the present invention, the external material 21 (of FIG. 1) further comprises: a non-magnetic spacer 20, and an external magnetic material 22 placed adjacent to the spacer 20. In this embodiment of the present invention, the non-magnetic spacer 20 is placed adjacent to the MGM border 34 and separates an exchange coupling within the MGM 15 from an exchange coupling within the external magnetic material 22.

In one embodiment of the present invention, as depicted in FIG. 1, a magnon mirror (MM) further includes a magnon mirror border (MMB) 47 (and/or 48) having the roughness, r 44; wherein the roughness r 44 of the MMB is smaller than the non-equilibrium magnon wave length λ 30.

In one embodiment of the present invention, the magnon mirror border (MMB) 48 comprises the border 32 of the MGM 15. In another embodiment of the present invention, the magnon mirror border (MMB) 47 is located adjacent to the border 34 of the MGM 15.

In one embodiment of the present invention, the means (C) further comprises: (C1) a means for pumping nonequilibrium electrons (not shown) into the MGM 15 (of FIG. 1), wherein propagation of the nonequilibrium electrons in the MGM 15 causes generation of the nonequilibrium magnons. In another embodiment of the present invention, the means (C) further comprises: (C2) a means for injecting nonequilibrium electrons (not shown) into the MGM 15 (of FIG. 1); wherein propagation of the nonequilibrium electrons in the MGM 15 causes generation of the nonequilibrium magnons. In one more embodiment of the present invention, the means (C) further comprises: (C3) a means for injecting nonequilibrium polarized electrons (not shown) into the MGM 15 (of FIG. 1); wherein the polarized electrons are polarized in the direction opposite to the direction of magnetization of the MGM 15; and wherein propagation of the polarized nonequilibrium electrons in the MGM 15 causes generation of the nonequilibrium magnons.

One more aspect of the present invention is directed to an apparatus for generation of nonequilibrium magnons (magnon laser). In one embodiment, as shown in FIG. 2, the apparatus 60 of the present invention for generation of nonequilibrium magnons comprises: a magnetic film 64 having width L 74 along z-direction 78 and having two facets 66 and 72 perpendicular to z-direction 78, wherein each facet 66 (and/or 72) of the magnetic film 64 comprises one magnon mirror (MM); and a means for generating the nonequilibrium magnons (not shown) in the magnetic film 64. In this embodiment of the present invention, the width L 74 of the magnetic film 64 is substantially greater than magnon wave length λ 76. In this embodiment of the present invention, roughness, r (65 and/or 71) of each magnon mirror border (MMB) (66 and/or 72 respectively) is substantially smaller than the magnon wave length λ 76. In this embodiment of the present invention, a lasing threshold condition (68 of FIG. 2) (magnon generation (Γe)≧magnon losses (Γm)) for non-equilibrium magnons is reached if attenuation of the non-equilibrium magnons due to magnon scattering is compensated by generation of the non-equilibrium magnons due to electron-magnon pumping.

Another aspect of the present invention is directed to an apparatus for generation of Terahertz radiation. In one embodiment of the present invention, the apparatus for generation of Terahertz radiation comprises (not shown): (A) a Magnon Gain Medium (MGM); and (B) at least one magnon mirror (MM), wherein the MGM supports generation of non-equilibrium magnons, and wherein nonequilibrium magnons are generated in the MGM, and wherein interaction between the nonequilibrium magnons leads to generation of Terahertz photons.

One more aspect of the present invention is directed to an apparatus for generation of Terahertz radiation. In one embodiment of the present invention, as depicted in FIG. 3, the apparatus 100 for generation of Terahertz radiation comprises: a magnetic film 124 having width L 116 along z-direction 130 and having two facets 112 and 114 perpendicular to z-direction 130, wherein each facet 112 (and/or 114) of the magnetic film 124 comprises one magnon mirror (MM); and a means for generating the nonequilibrium magnons (by injecting non-polarized electrons 113, or by injecting polarized electrons 132, or by pumping electrons 131) in the magnetic film 124, wherein interaction between the nonequilibrium magnons 126 leads to generation of Terahertz photons 128.

One aspect of the present invention is directed to a magnon resonant cavity having a magnon cavity space area. In one embodiment of the present invention, the magnon resonant cavity comprises: a Magnon Gain Medium is (MGM) 124 (of FIG. 3) further comprising a magnon active region, (115 of FIG. 3) and at least one magnon mirror (MM) 112 (and/or 114). In this embodiment of the present invention, the MGM 124 is placed in the magnon cavity space area. In this embodiment of the present invention, the magnon active region 115 is a geometrical area within the magnon cavity space area wherein nonequilibrium magnons are being generated.

One aspect of the present invention is directed to a Terahertz waveguide (TW). In one embodiment of the present invention, the Terahertz waveguide (TW) comprises (100 of FIG. 3): a Magnon Gain Medium (MGM) comprising a magnetic film 124 further comprising a magnon active region 115; two magnon mirrors (MM) 112 and 114; and a means for generating the nonequilibrium magnons (by injecting non-polarized electrons 113, or by injecting polarized electrons 132, or by pumping electrons 131) in the magnetic film 124. In this embodiment of the present invention, the magnetic film 124 is placed between two magnon mirrors (MM) 112 and 114 that are separated by distance L 116, wherein each MM is placed in the direction orthogonal to z-direction 130. In this embodiment of the present invention, each electron emits a non-equilibrium magnon 126 within the magnon active region 115. In this embodiment of the present invention, when electron pumping rate exceeds the threshold electron pumping rate the non-equilibrium magnons 126 that move along z-direction 130 meet the amplifying condition which leads to an exponential increase in their numbers with time, wherein interaction between the non-equilibrium magnons 126 leads to generation of Terahertz photons 128. In this embodiment of the present invention, the wave-length of each generated Terahertz photon 128 is much larger than the distance L 116 that separates the two MM 112 and 114, and therefore a substantial number of generated Terahertz photons 128 propagate in the direction orthogonal to z-direction 130.

I. Methods of the Present Invention for Generation of Non-equilibrium Magnons

In one embodiment, the method of the present invention for generation of nonequilibrium magnons comprises (not shown): (A) providing a MGM (magnetic film 124 of FIG. 3), wherein the MGM supports generation of nonequilibrium magnons; (B) providing at least one magnon mirror (MM) (112 and/or 114 of FIG. 3); and (C) generating the nonequilibrium magnons in the MGM (magnetic film 124 of FIG. 3).

In one embodiment of the present invention, the step (A) further comprises: (A1) placing the MGM (magnetic film 124 of FIG. 3) in a thermostat (not shown) to maintain temperature of the MGM (magnetic film 124 of FIG. 3) below a critical temperature.

In one embodiment of the present invention, the step (A) further comprises (not shown): (A2) selecting the MGM from the group consisting of: {a ferromagnetic semiconductor; a ferromagnetic insulator; a ferromagnetic material; a ferrimagnetic material; and a magnetic material}.

In one embodiment of the present invention, the step (C) further comprises: (C1) pumping nonequilibrium electrons (131 of FIG. 3) into the MGM (magnetic film 124 of FIG. 3), wherein propagation of the nonequilibrium electrons in the magnetic film (124 of FIG. 3) causes generation of the non-equilibrium magnons 126. In another embodiment of the present invention, the step (C) further comprises: (C2) injecting nonequilibrium electrons (113 of FIG. 3) into the MGM (magnetic film 124 of FIG. 3), wherein propagation of the nonequilibrium electrons in the magnetic film (124 of FIG. 3) causes generation of the nonequilibrium magnons 126. In one more embodiment of the present invention, the step (C) further comprises: (C3) injecting polarized nonequilibrium electrons (132 of FIG. 3) into the MGM (magnetic film 124 of FIG. 3), wherein the polarized electrons are polarized in the direction opposite to the direction of the magnetic moment M 119, and wherein propagation of the polarized nonequilibrium electrons in the in the magnetic film (124 of FIG. 3) causes generation of the nonequilibrium magnons 126.

K. Methods of the Present Invention for Generation of Terahertz Radiation

One aspect of the present invention is directed to a method for generation of Terahertz radiation. In one embodiment, the method of the present invention for generation of Terahertz radiation nonequilibrium magnons comprises (not shown): (A) providing a MGM; wherein the MGM supports generation of nonequilibrium magnons; (B) providing at least one magnon mirror (MM); and (C) generating the nonequilibrium magnons in the MGM; wherein interaction between the non-equilibrium magnons leads to generation of Terahertz photons.

One more aspect of the present invention is directed to a method for generation of Terahertz radiation. In one embodiment, the method of the present invention for generation of Terahertz radiation nonequilibrium magnons comprises (as shown in FIG. 3): (A) providing MGM further comprising a magnetic film 124 further comprising a magnon active region 115; (B) providing two magnon mirrors (MM) 112 and 114, wherein the magnetic film 124 is placed between two magnon mirrors (MM) 112 and 114 separated by distance L 116, and wherein each MM 112 (and 114) is placed in the direction orthogonal to z-direction 130; (C) pumping electrons 131 into the magnetic film 124, wherein each electron emits a non-equilibrium magnon 126 within the magnon active region 115, and wherein when electron pumping rate exceeds the threshold electron pumping rate the non-equilibrium magnons 126 that move along z-direction 130 meet the amplifying condition which leads to an exponential increase in their numbers with time; and (D) generating Terahertz radiation 128 due to interaction between the non-equilibrium magnons 126, wherein the wave-length of each generated Terahertz photon 128 is much larger than the distance L 116 that separates the two MMs 112 and 114, and wherein a substantial number of the generated Terahertz photons 128 propagates in the direction orthogonal to z-direction 130.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents

What is claimed is:

1. An apparatus for generation of nonequilibrium magnons comprising:
   (A) a Magnon Gain Medium (MGM); wherein said MGM supports generation of nonequilibrium magnons;
   (B) at least one magnon mirror (MM); and
   (C) a means for generating said nonequilibrium magnons in said MGM.

2. The apparatus of claim 1 further comprising:
   (D) a thermostat, wherein said MGM is placed in said thermostat, and wherein said thermostat is configured to maintain temperature of said MGM below a critical temperature.

3. The apparatus of claim 1, wherein said means (A) further comprises:
   (A1) said MGM selected from the group consisting of: {a ferromagnetic semiconductor; a ferromagnetic insulator; a ferromagnetic material; a ferrimagnetic material; and a magnetic material}.

4. The apparatus of claim 1, wherein at least one said magnon mirror (MM) further comprises:
   an internal magnon mirror (Internal MM); wherein said Internal MM comprises a part of said MGM that is located adjacent to a MGM border.

5. The apparatus of claim 1 further comprising an external material placed outside of said MGM; wherein at least one said magnon mirror (MM) further comprises:
   an external magnon mirror (External MM); wherein said External MM comprises a part of said external material adjacent to said MGM border.

6. The apparatus of claim 5, wherein said external material is selected from the group consisting of: {a non-ferromagnetic semiconductor; a non-ferromagnetic insulator; and a non-magnetic material}.

7. The apparatus of claim 5, wherein said external material further comprises:
   a non-magnetic spacer; said non-magnetic spacer being placed adjacent to said border of said MGM; and
   an external magnetic material being placed adjacent to said spacer; wherein said spacer separates an exchange coupling within said MGM from an exchange coupling within said external magnetic material.

8. The apparatus of claim 1, wherein each said magnon mirror (MM) further includes a magnon mirror border (MMB) located adjacent to said border of said MGM; said MMB having the roughness, r; wherein said roughness r of said MMB is smaller than said non-equilibrium magnon wave length $\lambda$.

9. The apparatus of claim 1, wherein said at least one magnon mirror (MM) further comprises:
   two magnon mirrors (MM).

10. The apparatus of claim 1, wherein said at least one magnon mirror (MM) further comprises:
    a circular magnon mirror (CMM).

11. The apparatus of claim 1, wherein said means (C) further comprises:
    (C1) a means for pumping nonequilibrium electrons into said MGM, wherein propagation of said nonequilibrium electrons in said MGM causes generation of said nonequilibrium magnons.

12. The apparatus of claim 1, wherein said means (C) further comprises:
    (C2) a means for injecting nonequilibrium electrons into said MGM; wherein propagation of said nonequilibrium electrons in said MGM causes generation of said nonequilibrium magnons.

13. The apparatus of claim 1, wherein said means (C) further comprises:
    (C3) a means for injecting nonequilibrium polarized electrons into said MGM; wherein said polarized electrons are polarized in the direction opposite to the direction of magnetization of said MGM; and wherein propagation of said polarized nonequilibrium electrons in said MGM causes generation of said nonequilibrium magnons.

14. An apparatus for generation of Terahertz radiation comprising:
    (A) a Magnon Gain Medium (MGM); wherein said MGM supports generation of nonequilibrium magnons; and
    (B) at least one magnon mirror (MM); wherein nonequilibrium magnons are generated in said MGM; and wherein interaction between said nonequilibrium magnons leads to generation of Terahertz photons.

15. An apparatus for generation of nonequilibrium magnons comprising:
    a magnetic film having width L along z-direction and having two facets perpendicular to said z-direction, and wherein each said facet of said magnetic film comprises one said magnon mirror (MM); and
    a means for generating said nonequilibrium magnons in said magnetic film.

16. The apparatus of claim 15, wherein said width L of said magnetic film is substantially greater than magnon wave length $\lambda$.

17. The apparatus of claim 15, wherein roughness r of each said magnon mirror border (MMB) is substantially smaller than said magnon wave length $\lambda$.

18. The apparatus of claim 15, wherein a lasing threshold condition for said non-equilibrium magnons is reached if attenuation of said non-equilibrium magnons due to magnon scattering is compensated by generation of said non-equilibrium magnons due to electron-magnon pumping.

19. An apparatus for generation of Terahertz radiation comprising:
    a magnetic film having width L along z-direction and having two facets perpendicular to said z-direction, and wherein each said facet of said magnetic film comprises one said magnon mirror (MM); and a means for generating said nonequilibrium magnons in said magnetic film; wherein interaction between said nonequilibrium magnons leads to generation of Terahertz photons.

20. A magnon resonant cavity having a magnon cavity space area; said magnon resonant cavity comprising:
a Magnon Gain Medium (MGM) further comprising a magnon active region; said MGM being placed in said magnon cavity space area; wherein said magnon active region is a geometrical area within said magnon cavity space area wherein nonequilibrium magnons are being generated; and
at least one magnon mirror (MM).

21. The magnon resonant cavity of claim 20; wherein said at least one magnon mirror (MM) further comprises:
at least two MM.

22. A Terahertz waveguide (TW) comprising:
a Magnon Gain Medium (MGM) further comprising a magnon active region;
two magnon mirrors (MM); said MGM being placed between said two magnon mirrors; said two MM being separated by distance L; each said MM being placed in the direction orthogonal to z-direction; and
a means for pumping electrons into said MGM;
wherein each said electron emits a non-equilibrium magnon within said magnon active region, and wherein when electron pumping rate exceeds the threshold electron pumping rate said non-equilibrium magnons that move along said z-direction meet the amplifying condition which leads to an exponential increase in their numbers with time; and wherein interaction between said non-equilibrium magnons leads to generation of Terahertz photons; and wherein the wave-length of each said generated Terahertz photon is much larger than said distance L that separates said two MM, and wherein a substantial number of said generated Terahertz photons propagate in the direction orthogonal to said z-direction.

23. A method for generation of nonequilibrium magnons comprising:
(A) providing a MGM; wherein said MGM supports generation of nonequilibrium magnons;
(B) providing at least one magnon mirror (MM); and
(C) generating said nonequilibrium magnons in said MGM.

24. The method of claim 23, wherein said step (A) further comprises:
(A1) placing said MGM in a thermostat to maintain temperature of said MGM below a critical temperature.

25. The method of claim 23, wherein said step (A) further comprises:
(A2) selecting said MGM from the group consisting of: {a ferromagnetic semiconductor; a ferromagnetic insulator; a ferromagnetic material; a ferrimagnetic material; and a magnetic material}.

26. The method of claim 23, wherein said step (C) further comprises:
(C1) pumping nonequilibrium electrons into said MGM; wherein propagation of said nonequilibrium electrons in said MGM causes generation of said nonequilibrium magnons.

27. The method of claim 23, wherein said step (C) further comprises:
(C2) injecting nonequilibrium electrons into said MGM; wherein propagation of said nonequilibrium electrons in said MGM causes generation of said nonequilibrium magnons.

28. The method of claim 23, wherein said step (C) further comprises:
(C3) injecting polarized nonequilibrium electrons into said MGM, wherein said polarized electrons are polarized in the direction opposite to the direction of magnetization of said MGM; and wherein propagation of said polarized nonequilibrium electrons in said MGM causes generation of said nonequilibrium magnons.

29. A method for generation of Terahertz radiation comprising:
(A) providing a MGM; wherein said MGM supports generation of nonequilibrium magnons;
(B) providing at least one magnon mirror (MM); and
(C) generating said nonequilibrium magnons in said MGM; wherein interaction between said nonequilibrium magnons leads to generation of Terahertz photons.

30. A method for generation of Terahertz radiation comprising:
(A) providing a Magnon Gain Medium (MGM) further comprising a magnon active region;
(B) providing two magnon mirrors (MM); said MGM being placed between said two magnon mirrors; said two MM being separated by distance L; each said MM being placed in the direction orthogonal to said z-direction;
(C) pumping electrons into said MGM; wherein each said electron emits a non-equilibrium magnon within said magnon active region, and wherein when electron pumping rate exceeds the threshold electron pumping rate said non-equilibrium magnons that move along said z-direction meet the amplifying condition which leads to an exponential increase in their numbers with time; and
(D) generating Terahertz radiation due to interaction between said non-equilibrium magnons; and wherein the wave-length of each said generated Terahertz photon is much larger than said distance L that separates said two MM, and wherein substantial number of said generated Terahertz photons propagates in the direction orthogonal to said z-direction.

* * * * *